US007527880B2

(12) United States Patent
Catalfamo

(10) Patent No.: US 7,527,880 B2
(45) Date of Patent: May 5, 2009

(54) WATER-SOLUBLE SUBSTRATE WITH RESISTANCE TO DISSOLUTION PRIOR TO BEING IMMERSED IN WATER

(75) Inventor: Vincenzo Catalfamo, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 11/824,701

(22) Filed: Jul. 2, 2007

(65) Prior Publication Data

US 2008/0008906 A1 Jan. 10, 2008

Related U.S. Application Data

(60) Provisional application No. 60/818,694, filed on Jul. 5, 2006.

(51) Int. Cl.

| | |
|---|---|
| ***B32B 19/04*** | (2006.01) |
| ***B05D 7/00*** | (2006.01) |
| ***B05D 5/00*** | (2006.01) |
| *B05D 7/22* | (2006.01) |

(52) U.S. Cl. ........................ 428/702; 427/402; 427/264; 427/230; 427/270; 510/224; 510/295; 510/296; 510/297; 510/298

(58) Field of Classification Search ................. 510/297, 510/295, 298, 296, 224; 501/296; 427/402–419.8, 427/264, 230, 270; 428/702
See application file for complete search history.

(56) References Cited

U.S. PATENT DOCUMENTS

| | | | | |
|---|---|---|---|---|
| 4,725,465 | A | 2/1988 | Lastovich | |
| 4,748,069 | A | 5/1988 | Cullen | |
| 4,919,973 | A * | 4/1990 | Alkan et al. | 427/213 |
| 5,296,282 | A | 3/1994 | Evers | |
| 5,389,425 | A | 2/1995 | Platt et al. | |
| 5,554,147 | A * | 9/1996 | Batich et al. | 604/890.1 |
| 6,509,072 | B2 | 1/2003 | Bening et al. | |
| 6,670,314 | B2 * | 12/2003 | Smith et al. | 510/220 |
| 7,229,955 | B2 | 6/2007 | Dasque et al. | |
| 2006/0165625 | A1 * | 7/2006 | Verrall et al. | 424/70.11 |
| 2008/0008859 | A1 | 1/2008 | Catalfamo | |
| 2008/0009585 | A1 | 1/2008 | Catalfamo | |
| 2008/0041751 | A1 | 2/2008 | Catalfmo | |

FOREIGN PATENT DOCUMENTS

| | | | |
|---|---|---|---|
| EP | 0 079 248 | A2 | 5/1983 |
| EP | 0 479 404 | A2 | 4/1992 |
| WO | WO 2005/056391 | A2 | 6/2005 |

OTHER PUBLICATIONS

PCT International Search Report, Mailed Feb. 4, 2008, 3 Pages.

* cited by examiner

*Primary Examiner*—Carol Chaney
*Assistant Examiner*—Nicole T Gugliotta
(74) *Attorney, Agent, or Firm*—Laura R. Grunzinger; Julie A. McConihay; Kim William Zerby

(57) ABSTRACT

A water-soluble substrate, and more particularly a water-soluble substrate that improves resistance to dissolution at neutral pH, and methods of making the same are disclosed. Articles, such as pouches, made from the water-soluble substrate, are also disclosed herein.

8 Claims, 3 Drawing Sheets

WATER-SOLUBLE SUBSTRATE WITH RESISTANCE TO DISSOLUTION PRIOR TO BEING IMMERSED IN WATER

CROSS REFERENCE TO RELATED APPLICATION

This application claims the U.S. Provisional Application Ser. No. 60/818,694, filed Jul. 5, 2006, the disclosure of which is incorporated by reference.

FIELD OF THE INVENTION

This invention relates to a water-soluble substrate, and more particularly a water-soluble substrate which has improved resistance to dissolution at neutral pH, and methods of making the same. This invention also relates to articles, such as pouches, made from the water-soluble substrate.

BACKGROUND OF THE INVENTION

Water-soluble substrates are gaining wider acceptance for use as packaging materials. Packaging materials include films, sheets, blown or molded hollow bodies (i.e. sachets, pouches, and tablets), bottles, receptacles and the like. Often, water-soluble substrates, when used in the preparation of certain types of these articles such as sachets and pouches, disintegrate and/or become sticky when exposed to small amounts of water or high humidity. This can make them unsuitable for usage in the packaging and storage of the compositions contained therein.

The most common consumer complaint for water-soluble pouches is linked to unwanted pouch dissolution when accidentally exposed to small amounts of water, such as when water gets inside the outer packaging in which the pouches are sold and stored after purchase, from wet hands, high humidity, leaking sinks or pipes during storage. This may cause the water-soluble pouches to leak prior to use and/or stick together. The second most frequent complaint is that of the water-soluble pouch failing to fully dissolve upon use. Thus, there remains an unmet need for water-soluble substrates and articles made therefrom, such as sachets and pouches, which have improved resistance to dissolution against exposure to small amounts of water yet can subsequently dissolve very quickly when immersed in an aqueous solution, such as rinse and/or wash water.

Various methods are known in the art to retard the dissolution of water-soluble substrates, typically involving coating the water-soluble substrate with a material which is water-insoluble. For example, U.S. Pat. No. 6,509,072 describes a water-soluble substrate comprising a barrier coating. The barrier coating is a polymeric film which forms a continuous film on the water-soluble substrate. Another example of a barrier coating is described in WO 01/23460, assigned to Kao Corporation, wherein a surface of the water-soluble substrate is coated with a particulate or fibrous water-insoluble material wherein the amount of the water-insoluble material used is 0.1-80 parts per 100 parts by weight of the water-soluble film. In use (which typically involves immersing the water-soluble substrate in an aqueous solution) however, it is desired that the coating quickly disintegrates. Depending on the use of the water-soluble substrate, the aqueous solution into which the substrate or an article comprising the substrate is to be immersed, may have a pH which is acid or alkaline. Although coatings of the prior art may provide sufficient resistance against accidental water contact (at a neutral pH), they may not be able to quickly disintegrate or dissolve when immersed in acid or alkaline solutions.

It is therefore an aspect of the present invention to provide water-soluble substrates which improves resistance to dissolution at neutral pH, yet can dissolve very quickly when immersed in an aqueous solution having an acid or an alkaline pH.

SUMMARY OF THE INVENTION

The present invention relates to a water-soluble substrate comprising a first surface and a second surface opposite to the first surface, having a coating applied to at least one of said first and second surfaces, characterized in that said coating comprises a material which is water-soluble at a pH of from 6 to 7, and further comprises a material that is water-soluble either at a pH of less than 6 or at a pH of more than 7.

The present invention also relates to an articles comprising the water-soluble substrate, and to a method of making the water-soluble substrate.

DETAILED DESCRIPTION OF THE INVENTION

This invention relates to a water-soluble substrate, and more particularly a water-soluble substrate which has improved resistance to dissolution at neutral pH, and methods of making the same. The water-soluble substrate is, however, water-soluble when immersed in aqueous solutions having an acid or an alkaline pH. This invention also relates to articles comprising the water-soluble substrate described herein.

Water-soluble Substrate

Figure 1:
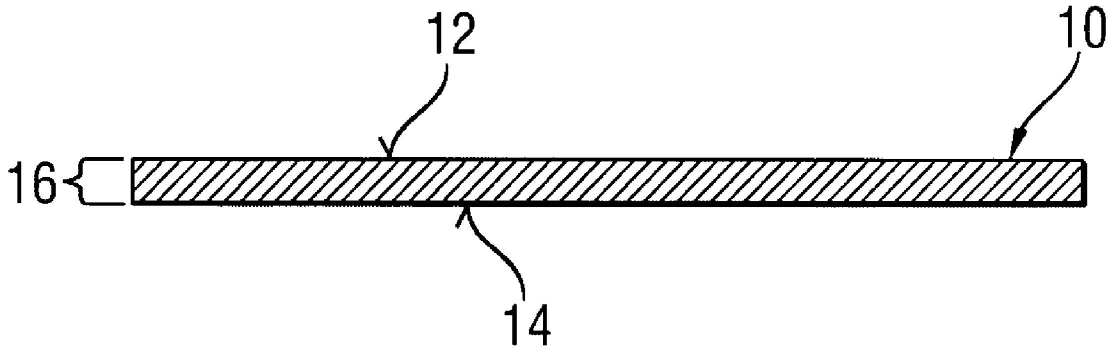
FIG. 1 shows a cross-section of a non-coated water-soluble substrate.

FIG. 1 shows a cross-section of a water-soluble substrate 10. The water-soluble substrate 10 has a first surface 12, a second surface 14 opposite to the first surface 12, and a thickness 16 between the first surface 12 and the second surface 14. The water-soluble substrate 10 can be in the form of a film, a sheet, or a foam, and includes woven and non-woven structures.

The water-soluble substrate is made of polymeric materials and has a water-solubility of at least 50 weight %, as measured by the method set out here after using a glass-filter with a maximum pore size of 20 microns. Preferably the water-solubility of the substrate is at least 75 weight % or even more preferably at least 95 weight %.

50 grams±0.1 gram of substrate material is added in a pre-weighed 400 ml beaker and 245 ml±1 ml of 25° C. distilled water is added. This is stirred vigorously on a magnetic stirrer set at 600 rpm, for 30 minutes. Then, the mixture is filtered through a folded qualitative sintered-glass filter with a pore size as defined above (max. 20 micron). The water is dried off from the collected filtrate by any conventional method, and the weight of the remaining material is determined (which is the dissolved fraction). Then, the % solubility can be calculated.

Typically the water-soluble substrate 10 has a basis weight of from 0.33 to 1,667 grams per square meter, preferably from 33 to 167 grams per square meter. The thickness of the water-soluble substrate 10 between the first surface 12 and the second surface 14 can range from about 0.75 micrometer to about 1,250 micrometer, preferably from about 10 micrometer to about 250 micrometer, more preferably from about 25 micrometer to about 125 micrometer.

Preferred polymers, copolymers or derivatives thereof suitable for use as substrate material are selected from polyvinyl alcohol (PVA), polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum, polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, polyvinyl alcohol copolymers, hydroxypropyl methyl cellulose (HPMC), and mixtures thereof. The most preferred polymer is polyvinyl alcohol. Preferably, the level of polymer in the substrate is at least 60%.

Examples of commercially available water-soluble films are PVA films known under the trade reference MonoSol M8630, as sold by MonoSol LLC of Gary, Ind., US, and PVA films of corresponding solubility and deformability characteristics. Other films suitable for use herein include films known under the trade reference PT film or the K-series of films supplied by Aicello, or VF-HP film supplied by Kuraray.

pH-sensitive Coating

Figure 2:
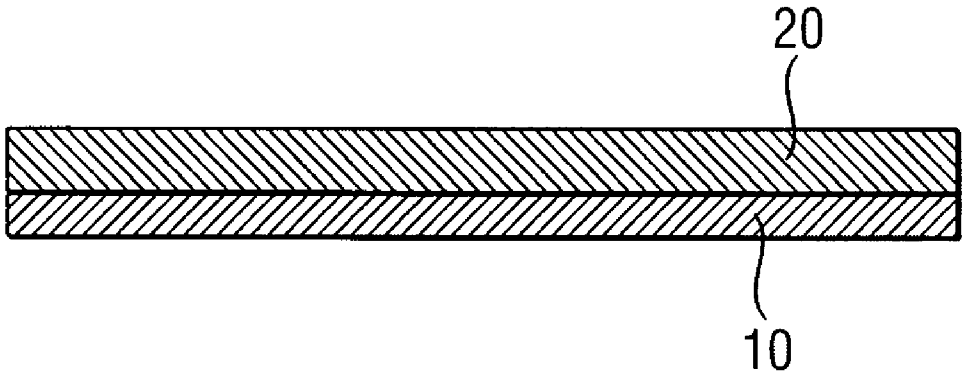
FIG. 2 shows a cross-section of one embodiment of a water-soluble substrate according to the present invention.

As shown in FIG. 2, a coating 20 is applied to, and preferably substantially covers, at least one of the first or second surfaces 12, 14 of the water-soluble substrate 10. With "substantially covers", it is meant that at least 95%, preferably at least 99%, and most preferably 100% of the first or second surface 12, 14 is covered by the coating 20. This ensures that upon accidental water-contact, the water will either not be able to reach the first or second surface 12, 14 of the water-soluble substrate 10, or the amount of water that reaches said surface, is not enough to completely dissolve the water-soluble substrate 10.

The coating 20 is preferably applied at a weight ratio of coating:water-soluble substrate of from 0.1 to 100, preferably from 0.1 to 10, more preferably from 0.2 to 2.

The coating 20 comprises a material (also referred to as "pH-sensitive material") which is water-insoluble at a pH of from 6 to 7, and is water-soluble either at a pH which is less than 6, or at a pH which is more than 7. Water may accidentally contact the water-soluble substrate such as for example water from leaking water pipes, or water from wet hand contact, has a neutral pH. The coating of the present invention thus protects the water-soluble substrate. Articles made of the water-soluble substrate include for example pouches filled with detergents. The aqueous environment in which these pouches are to be used, often has an acidic or alkaline pH. The coating of the present invention thus dissolves quickly in these environments, and ensures that the water-soluble substrate dissolves quickly.

With the term "water-soluble at a pH of from 6 to 7", it is meant that the material has a water-solubility at a pH of from 6 to 7 of at least 50 weight %. Preferably, the water-solubility is at least 75 weight % or even more preferably at least 95 weight %, as measured by the method previously described herein.

With the term "water-insoluble at a pH of less than 6" or "water-insoluble at a pH higher than 7", it is meant that the material has a water-solubility at a pH of less than 6, or at a pH of higher than 7 of less than 50 weight %. Preferably, the water-solubility is less than 40% weight % or even more preferably less than 30 weight %. For determining the water-solubility at a certain pH, the pH of the distilled water used in the method previously described herein, is adjusted accordingly.

Such a coating 20 provides the benefit that upon accidental water contact, including contact with wet hands, the coating 20 is sufficiently resistant such that the water is not able to reach the surface of the water-soluble substrate 10. Depending in which environment the water-soluble substrate 10 is to be used (acidic or alkaline), the coating is capable of quickly dissolving or disintegrating and thus allowing excess water to reach the water-soluble substrate 10.

In one embodiment, the coating 20 comprises a material which is water-soluble at a pH of less than 6, preferably at a pH of 1 to 5.9, more preferably at a pH of 1.5 to 5.5, even more preferably at a pH of 2 to 5. Examples of suitable materials which are soluble in an acidic environment include, but are not limited to, vinylpyridrine/styrene co-polymers material supplied by Adisseo (Alpharetta, Ga.) which is soluble at pH 2.0 and insoluble at pH greater then 2.0, SQZgel pH-sensitive polymers mixture supplied by MacroMed Inc. (Sandy, Utah) which is soluble at pH greater then 3.0, meta-acrylic acid and co-polymers materials supplied by Bristol Myers Squibb (New York, N.Y.) which are soluble at pH greater than 4.5, Eudragit L30D supplied by Rhom Pharma/Degussa (Rockaway, N.J.) which is soluble at pH greater then 5.5.

In another embodiment, the coating 20 comprises a material which is water-soluble at a pH of more than 7, preferably at a pH of 7.5 to 15, more preferably at a pH of 8-to 14.5, even more preferably at a pH of 8.5 to 14. Examples of suitable materials which are soluble in an alkaline environment include, but are not limited to, Eudragit S100 supplied by Rhom Pharma/Degussa (Rockaway, N.J.) which is soluble at pH greater than 7.0, Styrene (or Acrylates)/p-Hydroxystyrene co-polymers materials supplied by Sandoz (Princeton, N.J.) which are soluble at pH greater then 8.0.

Preferably, the coating 20 comprises at least 50%, preferably at least 60%, more preferably at least 70%, even more preferably at least 80%, even more preferably at least 90% by weight of the pH-sensitive material. Most preferably the coating 20 consists essentially entirely of the pH-sensitive material.

For certain applications that the dissolution rate (when immersed) of the coating 20 itself is increased by applying discrete zones of an acidic material (for an acidic pH sensitive coating) or of an alkaline material (for an alkaline pH sensitive coating). As used herein "discrete zones" means zones having a relatively small exposed surface area, preferably from 0.1 $mm^2$ to 400 $mm^2$, more preferably from 1 $mm^2$ to 200 $mm^2$, even more preferably from 10 $mm^2$ to 100 $mm^2$, and which do not contact each other and may be in a pattern which can be random or non-random. These discrete zones, when surface area is combined, represent from 10%, preferably from 20%, more preferably from 30%, even more preferably from 40% and up to 70%, preferably up to 80% and more preferably up to 90% of the surface area of the first or second surface 12, 14. When immersed, these discrete zones of acidic or alkaline material ensure that the pH is locally decreased or increased, and thus have a boosting effect on the degradation of the coating 20. The acidic or alkaline material may be applied in various ways.

Figure 3A:
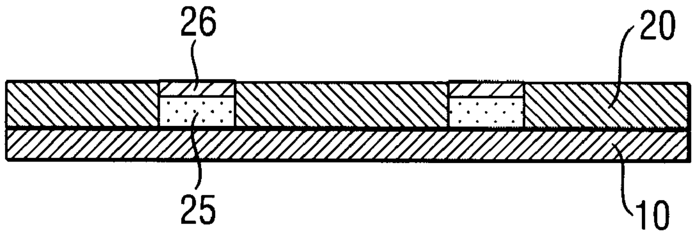
FIGS. 3A to 3E show a cross-section of another embodiment of a water-soluble substrate according to the present invention.

In one embodiment and as shown in FIG. 3A, the acidic or alkaline material is applied within the coating 20. More specifically, the pH-sensitive coating 20 is first applied in a discontinuous manner, and the acidic/alkaline material is then applied in the zones 25 not covered by the pH-sensitive coating. Alternatively, the acidic/alkaline material is first applied in discrete zones, after which the pH-sensitive coating 20 is applied. It is preferred that a coating 26 of a material which is less water-soluble than said water-soluble substrate 10 is applied to the discrete zones 25 of acidic/alkaline material, to avoid that accidental water-contact may actually trigger the pH-sensitive coating 20 to degrade.

Figure 3B:
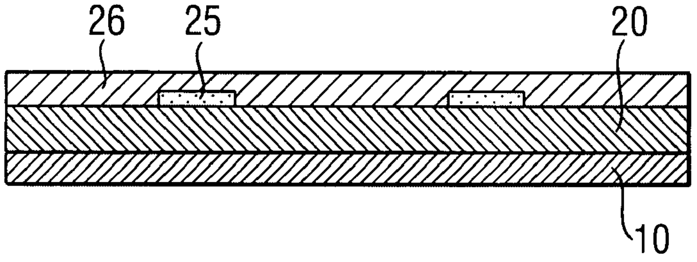

In another embodiment and as shown in FIG. 3B, the acidic or alkaline material is applied onto the pH-sensitive coating. It is preferred that a coating 26 of a material which is less water-soluble than said water-soluble substrate 10 is applied to the discrete zones 25 of acidic/alkaline material, and optionally on top of the pH-triggered coating 20, to avoid that accidental water-contact may actually trigger the pH-sensitive coating 20 to degrade.

Figure 3C:
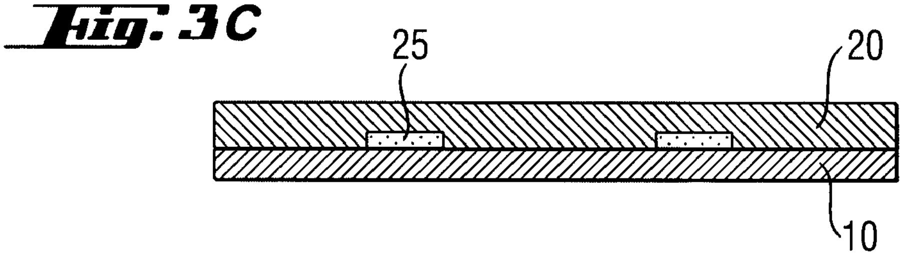

In another embodiment and as shown in FIG. 3C, the acidic or alkaline material is applied between the surface of the water-soluble substrate and the pH-sensitive coating 20.

Figure 3D:
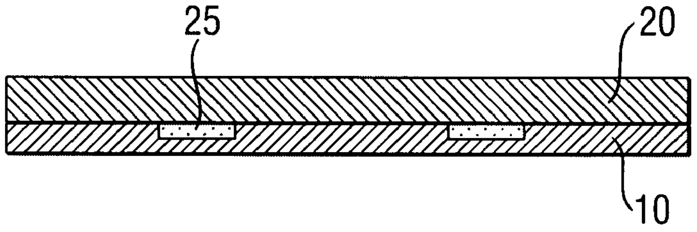

In yet another embodiment and as shown in FIG. 3D, the acidic or alkaline material is incorporated within the water-soluble substrate 10.

Figure 3E:
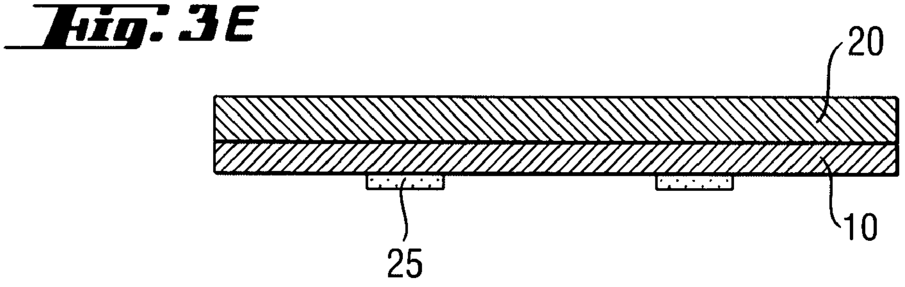

In yet another embodiment and as shown in FIG. 3E, the acidic or alkaline material is applied to the surface of the water-soluble substrate opposite to the surface onto which the pH-sensitive coating 20 is applied.

The discrete zones 25 of acidic or alkaline material preferably represent less than 20% by weight of said water-soluble substrate 10. Examples of acidic materials include, but are not limited thereto, salts formed by strong acids with weak bases (such as ammonium chloride) and weak acids with weak bases with acidic pKa (hydrolysis), organic and inorganic acids, salts thereof, acid precursors, or combinations thereof. Organic acid compounds, include carboxylic acids, phenolic acid, ascorbic acid (vitamin C for food applications), humic acid, pyroligneous acid, acetic acid, benzoic acid, butyric acid, citric acid, formic acid, lactic acid, malic acid, mandelic acid, methanethiol, propionic acid, pyruvic acid, valeric acid. Inorganic acid compounds include hydrobromic acid, hydrochloric acid, hydroiodic acid, nitric acid, sulfuric acid, perchloric acid, boric acid, carbonic acid, chloric acid, hydrofluoric acid, phosphoric acid, pyrophosphoric acid.

Preferred alkaline materials are, but are not limited thereto, salts formed by weak acids with strong bases (such as sodium acetate) and weak acids with weak bases with basic pKa (hydrolysis), carbonates and bicarbonates, metal hydroxides, ammonia and amines, mono-ethanolamine, metal oxides, pyridine, their salts and combinations thereof.

The coating 20 may further comprise other components which are resistant to accidental water contact and are less water-soluble than the water-soluble substrate 10.

One example of such a component is polyvinyl alcohol having a high hydrolysis degree. Preferably, the hydrolysis degree of the polyvinyl alcohol used in the coating is greater than 97%.

Another example of such a component is an inorganic or an organic material. The inorganic material may be zeolite, bentonite, talc, mica, kaolin, sepiolite, silica, calcium carbonate, titanium oxide, anhydrous silicic acid, hydroxy calcium apatite, phthalocyanine blue, Helindone Pink, Hansa Orange, pearlescent material, etc., while zeolite, bentonite, talc, mica, kaolin, silica, titanium oxide, silicone, etc. are preferred. The organic material may be a synthetic polymer selected from polyethylene, polypropylene, polyamide, polyethylene terephthalate, polystyrene, polyurethane and/or its cross-linked product, sodium poly(meth)acrylic acid, poly(meth) acrylic acid ester and/or its cross-linked product, rubber such as ethylene rubber, propylene rubber, styrene-butadiene rubber, butadiene rubber, silicone rubber, etc. and/or its cross-linked products; or a natural polymer such as cellulose and/or its derivatives, starch and/or their derivatives, seed hulls and/or their derivatives. Polyethylene, polyamide, polystyrene, sodium poly(meth)acrylic acid, poly(meth)acrylic acid ester, cellulose and/or its derivatives, starch, etc. are preferred. Here, poly(meth)acrylic acid means both polyacrylic acid and polymethacrylic acid.

The coating according to the present invention can be opaque, but is preferably transparent or translucent. Also preferred are colored or three-dimensional coatings in order to create appealing effects such as tactile (touch) effects or visual effects, such as graphics, cartoons, logo's, branding, user's instructions, and the like.

Optional Ingredients

It may be required for certain applications that the dissolution rate (when immersed) of the water-soluble substrate 10 is increased. Disintegrants may be added to the coating 20 in order to speed up the dissolution when the water-soluble substrate is immersed in water. Where present, the level of disintegrant in the coating 20 is from 0.1 to 30%, preferably from 1 to 15%, by weight of said coating 20. Alternatively, disintegrants may also be applied on the surface of the water-soluble substrate 10, opposite to the surface onto which the coating 20 is applied, or they may be applied onto both surfaces of the water-soluble substrate 10, or they may be integrated into the water-soluble substrate 10, or any combination thereof. Any suitable disintegrant can be used. Preferred disintegrants for use herein are corn/potato starch, methyl cellulose/celluloses, mineral clay powders, croscarmelose (cross-linked cellulose), crospovidine (cross-linked polymer), sodium starch glycolate (cross-linked starch).

A dye indicator, such as for example litmus, may optionally be applied to the water-soluble substrate 10, within or onto the pH-sensitive coating 20, or combinations thereof. Such an indicator can visually show that the pH-sensitive coating is activated and as such, can provide a signal to a consumer that the system is working.

The water-soluble substrate-forming composition and the water-soluble substrate 10 formed therefrom can also comprise one or more additive or adjunct ingredients. For example, the water-soluble substrate-forming composition and the water-soluble substrate 10 may contain: plasticizers, lubricants, release agents, fillers, extenders, anti-blocking agents, de-tackifying agents, antifoams, or other functional ingredients. The latter may, in the case of articles containing compositions for washing, include, but are not limited to functional detergent additives to be delivered to the wash water, for example organic polymeric dispersants, or other detergent additives.

Suitable plasticizers include, but are not limited to: glycerol, glycerin, diglycerin, hydroxypropyl glycerine, sorbitol, ethylene glycol, diethylene glycol, triethylene glycol, tetraethylene glycol, propylene glycol, polyethylene glycols, neopentyl glycol, trimethylolpropane, polyether polyols, ethanolamines, and mixtures thereof. The plasticizer can be incorporated in the water-soluble substrate 10 in any suitable amount including, but not limited to amounts in the range of from about 5% to about 30% by weight, or in the range of from about 12% to about 20% by weight.

Suitable surfactants may include the nonionic, cationic, anionic and zwitterionic classes. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). The surfactant can be incorporated in the water-soluble substrate 10 in any suitable amount including amounts in the range of from about 0.01% to about 1% by weight, or in the range of from about 0.1% to about 0.6% by weight.

Suitable lubricants/release agents include, but are not limited to, fatty acids and their salts, fatty alcohols, fatty esters, fatty amines, fatty amine acetates and fatty amides. The lubricant/release agent can be incorporated in the water-soluble substrate 10 in any suitable amount including amounts within the range of from about 0.02% to about 1.5% by weight, or in the range of from about 0.04% to about 0.15% by weight.

Suitable fillers, extenders, antiblocking agents, detackifying agents include, but are not limited to: starches, modified starches, crosslinked polyvinylpyrrolidone, crosslinked cellulose, microcrystalline cellulose, silica, metallic oxides, calcium carbonate, talc and mica. The filler, extender, antiblocking agent, detackifying agent can be present in the water-soluble substrate 10 in any suitable amount including amounts in the range of from about 0.1% to about 25% by weight, preferably in the range of from about 1% to about 15% by weight. In the absence of starch, it may be desirable for the filler, extender, antiblocking agent, detackifying agent to be present in a range of from about 1% to about 5% by weight.

Suitable antifoams include, but are not limited to, those based on polydimethylsiloxanes and hydrocarbon blends. The antifoam can be present in the water-soluble substrate 10 in any suitable amount including amounts in the range of from about 0.001% to about 0.5%, preferably in the range of from about 0.01% to about 0.1% by weight.

The water-soluble substrate-forming composition is prepared by mixing the materials and agitating the mixture while raising the temperature from about 70° F. (about 21° C.) to 195° F. (about 90° C.) until solution is complete. The substrate-forming composition may be made into any suitable form (e.g. film or sheets) and may then be subsequently formed into any suitable product (e.g. single- and multiple-compartment pouches, sachets, bags, etc.).

Methods of Making a Water-soluble Substrate

There are numerous non-limiting embodiments of the method of making the water-soluble substrate 10 described herein.

In one embodiment, the method comprises providing a previously formed water-soluble substrate 10 and applying a coating 20 to at least one of the surfaces 12, 14 of the previously formed water-soluble substrate 10.

The coating 20 can be applied to the previously formed water-soluble substrate 10 in a number of different manners. In one non-limiting embodiment, the coating 20 is applied to at least one of the surfaces 12, 14 of the previously formed water-soluble substrate 10 in the form of particles or a powder. Preferably, the particles or the powder are applied to the water-soluble substrate 10 via a jet, or electro-statically. Due to the high speed of the jet, some of the particles/powder is embedded into the substrate, thereby reducing, or even eliminating the need for using a binder. Also when the particles or powder are applied electro-statically, a binder is generally not needed. Nevertheless, a binder may be used. The binder may first be applied to the water-soluble substrate 10, before the particles or powder is applied. Or, alternatively, the binder may be mixed with the particles or powder, and then the mixture is added to the water-soluble substrate 10.

In another non-limiting embodiment of the method, the coating 20 is provided in the form of a solution that is applied onto at least one of the surfaces 12, 14 of the water-soluble substrate 10, and is allowed to dry, or undergoes a drying process. The solution can be applied on the film by means of any coating process, including spray, knife, rod, kiss, slot, painting, printing and mixtures thereof. Printing is preferred for use herein. Printing is a well established and economic process. Printing is usually done with inks and dyes and used to impart patterns and colours to substrates but in the case of the invention printing is used to deposit the less water-soluble material(s) onto a water-soluble substrate. Any kind of printing method can be used, including rotogravure, lithography, flexography, porous and screen printing, inkjet printing, letterpress, tampography and combinations thereof.

These embodiments may also comprise a step of wetting at least a portion of at least one of the surfaces 12, 14 of the water-soluble substrate 10 prior to applying the coating 20 to the previously formed water-soluble substrate 10. The wetting of at least one of the surfaces 12, 14 of the water-soluble substrate 10 may be used to at least partially dissolve or solubilize an outer portion of the surface 12, 14 of the substrate 10 (that is, part of the way into the thickness of the substrate). The water-soluble substrate 10 may be at least partially solubilized to any suitable depth in order to partially embed the coating into the substrate. Suitable depths include, but are not limited to: from about 1% to about 40% or about 45%, from about 1% to about 30%, from about 1% to about 20%, from about 1% to about 15%, and alternatively, from about 1% to about 10% of the overall substrate thickness 16. The less water-soluble material 20 is then applied to the partially dissolved portion of at least one of the surfaces 12, 14 of the substrate 10. This allows the coating 20 to be embedded into an outer portion of the surface 12, 14 of the substrate 10, and to become a more permanent part of the substrate 10. The wetted surface 12, 14 of the substrate 10 with the coating 20 embedded into the same is then permitted to dry. Such an embodiment of the method may also comprise a step of removing at least some of any loose or excess of coating 20 remaining on the surface of the water-soluble substrate 10 after it has dried, such as by wiping or dusting the surface of the substrate 10.

In another embodiment, the coating 20 can be added to the water-soluble substrate 10 after the substrate 10 is made into a product. For example, if the water-soluble substrate 10 is used to form a water-soluble pouch that contains a composition, the coating 20 can be added to the substrate 10 on at least a portion of the surface of the water-soluble pouch.

In another non-limiting embodiment of the method, the coating 20 is applied in multiple application steps. A first layer of coating 20 is applied to the water-soluble substrate 10 according to any of the above methods, and is optionally allowed to dry. Subsequently, one or more additional coating layers (each optionally including a drying step) may be added until the desired coating thickness is obtained. As such, relatively thick coatings can be created on thin water-soluble substrates.

In another non-limiting embodiment of the method, a layer of coating may be formed separately, after which it is applied as a coating layer to a surface of the water-soluble substrate.

Methods of Making a Water-soluble Pouch

The water-soluble substrate 10 described herein can be formed into articles, including but not limited to those in which the water-soluble substrate 10 is used as a packaging material. Such articles include, but are not limited to water-soluble pouches, sachets, and other containers.

Water-soluble pouches and other such containers that incorporate the water-soluble substrate 10 described herein can be made in any suitable manner known in the art. The water-soluble substrate 10 can be provided with improved resistance to dissolution either before or after forming the same into the final product. In either case, in certain embodiments it is desirable when making such articles, that the surface 12, 14 of the substrate 10 on which the coating is applied, forms an outer surface of the article.

There are a number of processes for making water-soluble pouches. These include, but are not limited to processes known in the art as: vertical form-fill-sealing processes, horizontal form-fill sealing processes, and formation of the pouches in molds on the surface of a circular drum. In vertical form-fill-sealing processes, a vertical tube is formed by folding a substrate. The bottom end of the tube is sealed to form an open pouch. This pouch is partially filled allowing a head space. The top part of the open pouch is then subsequently sealed together to close the pouch, and to form the next open pouch. The first pouch is subsequently cut and the process is repeated. The pouches formed in such a way usually have pillow shape. Horizontal form-fill sealing processes use a die having a series of molds therein. In horizontal form-fill sealing processes, a substrate is placed in the die and open pouches are formed in these molds, which can then be filled, covered with another layer of substrate, and sealed. In the third process (formation of pouches in molds on the surface of a circular drum), a substrate is circulated over the drum and pockets are formed, which pass under a filling machine to fill the open pockets. The filling and sealing takes place at the highest point (top) of the circle described by the drum, e.g. typically, filling is done just before the rotating drum starts the downwards circular motion, and sealing just after the drum starts its downwards motion.

In any of the processes that involve a step of forming of open pouches, the substrate can initially be molded or formed into the shape of an open pouch using thermoforming, vacuum-forming, or both. Thermoforming involves heating the molds and/or the substrate by applying heat in any known way such as contacting the molds with a heating element, or by blowing hot air or using heating lamps to heat the molds and/or the substrate. In the case of vacuum-forming, vacuum assistance is employed to help drive the substrate into the mold. In other embodiments, the two techniques can be combined to form pouches, for example, the substrate can be formed into open pouches by vacuum-forming, and heat can be provided to facilitate the process. The open pouches are then filled with the composition to be contained therein.

The filled, open pouches are then closed, which can be done by any method. In some cases, such as in horizontal pouch-forming processes, the closing is done by continuously feeding a second material or substrate, such as a water-soluble substrate, over and onto the web of open pouches and then sealing the first substrate and second substrate together. The second material or substrate can comprise the water-soluble substrate 10 described herein. It may be desirable for the surface of the second substrate onto which the coating is applied, to be oriented so that it forms an outer surface of the pouch.

In such a process, the first and second substrates are typically sealed in the area between the molds, and, thus, between the pouches that are being formed in adjacent molds. The sealing can be done by any method. Methods of sealing include heat sealing, solvent welding, and solvent or wet sealing. The sealed webs of pouches can then be cut by a cutting device, which cuts the pouches in the web from one another, into separate pouches. Processes of forming water-soluble pouches are further described in U.S. patent application Ser. No. 09/994,533, Publication No. US 2002/0169092 A1, published in the name of Catlin, et al.

Articles of Manufacture

Figure 4:
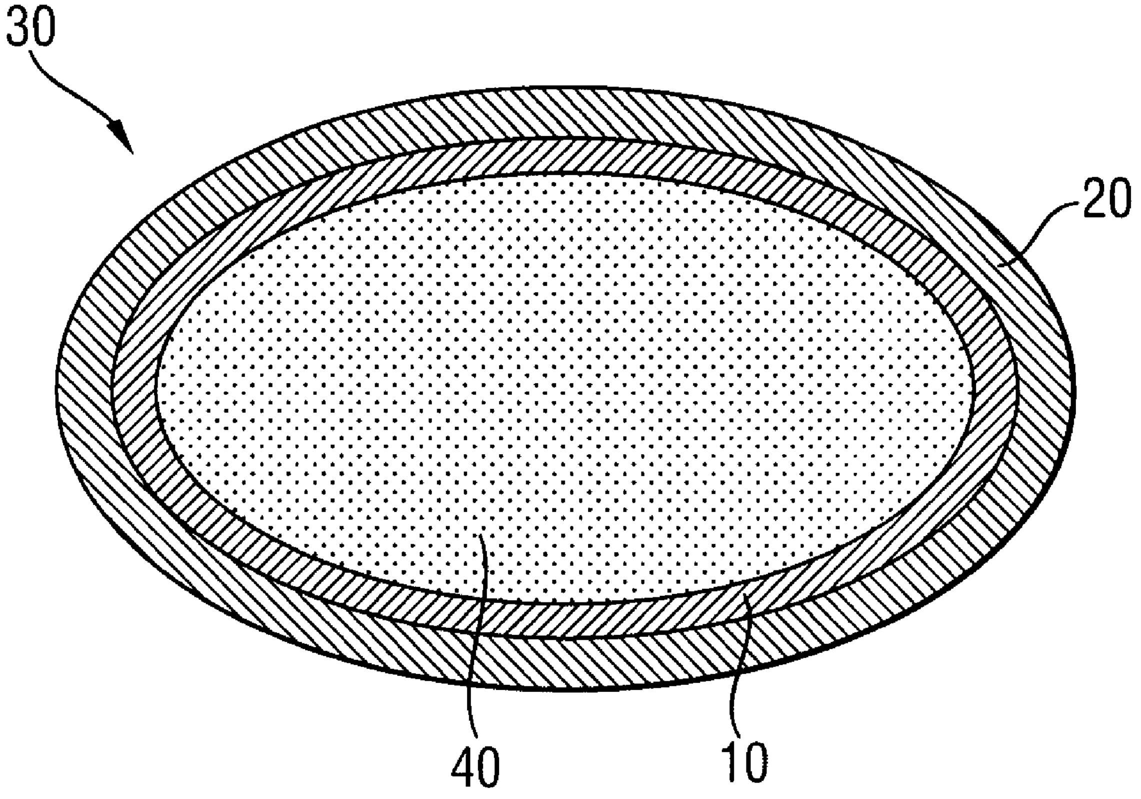
FIG. 4 shows a cross-section of an article comprising a water-soluble substrate according to the present invention.

As shown in FIG. 4, the present invention also includes articles comprising a product composition 40 and a water-soluble substrate 10, which may be formed into a container 30, such as a pouch, a sachet, a capsule, a bag, etc. to hold the product composition. The surface of the water-soluble substrate 10 which has the coating 20 applied thereto, may be used to form an outside surface of the container 30. The water-soluble substrate 10 may form at least a portion of a container 30 that provides a unit dose of the product composition 40.

For simplicity, the articles of interest herein will be described in terms of water-soluble pouches, although it should be understood that discussion herein also applies to other types of containers.

The pouches 30 formed by the foregoing methods, can be of any form and shape which is suitable to hold the composition 40 contained therein, until it is desired to release the composition 40 from the water-soluble pouch 30, such as by immersion of the water-soluble pouch 30 in water. The pouches 30 can comprise one compartment, or two or more compartments (that is, the pouches can be multi-compartment pouches). In one embodiment, the water-soluble pouch 30 may have two or more compartments that are in a generally superposed relationship and the pouch 30 comprises upper and lower generally opposing outer walls, skirt-like side walls, forming the sides of the pouch 30, and one or more internal partitioning walls, separating different compartments from one another. If the composition 40 contained in the pouches 30 comprises different forms or components, the different components of the composition 40 may be contained in different compartments of the water-soluble pouch 30 and may be separated from one another by a barrier of water-soluble material.

The pouches or other containers 30 may contain a unit dose of one or more compositions 40 for use as/in laundry detergent compositions, automatic dishwashing detergent compositions, hard surface cleaners, stain removers, fabric enhancers and/or fabric softeners, food and beverage and new product forms where contact with small amounts of water could create premature pouch dissolution, unwanted pouch leakage and/or undesirable pouch-to-pouch stickiness. The compositions 40 in the pouches 30 can be in any suitable form including, but not limited to: liquids, liquigels, gels, pastes, creams, solids, granules, powders, etc. The different compartments of multi-compartment pouches 30 may be used to separate incompatible ingredients. For example, it may be desirable to separate bleaches and enzymes into separate compartments. Other forms of multi-compartment embodiments may include a powder-containing compartment in combination with a liquid-containing compartment. Additional examples of multiple compartment water-soluble pouches are disclosed in U.S. Pat. No. 6,670,314 B2, Smith, et al.

The water-soluble pouches 30 may be dropped into any suitable aqueous solution (such as hot or cold water), whereupon water-soluble substrate material 10 forming the water-soluble pouches 30 dissolves to release the contents of the pouches.

The water-soluble substrate 10 described herein can also be used for coating products and other articles. Non-limiting examples of such a product are laundry detergent tablets or automatic dishwashing detergent tablets. Other examples include coating products in the food and beverage category where contact with small amounts of water could create premature dissolution, unwanted leakage and/or undesirable stickiness.

EXAMPLES

An example of using a pH-triggered coating to trigger the dissolution of a water soluble/dispersible substrate in presence of tap water at a pH of 7-8 is described here below.

The pH-triggered coating such as SQXgel™ (supplied by MacroMed, Sandy, Utah) which dissolves at a pH of 3.0, is applied to the water soluble substrate first. Then, small discrete areas (such as dots) of an acidic material (such as citric acid) are applied onto the pH-triggered coated substrate. The small amounts and the rapid drying upon application of the acidic material do not cause the pH-triggered coating to substantially solubilize/break-down. A third layer of a water resistant coating (for example talc) is applied onto the substrate to cover both the acidic material and the pH-triggered coatings. In presence of small amounts of water (accidental contact with wet hands, rain drops, water spills), the coated substrate will not solubilize/break-down. When immerged in a full tap water bath at pH 6-7 for the required time (such as in in-use consumer applications), the foremost outer water resistance coating layer solubilizes. The acidic material, in contact with the water, then creates localized low pH areas (pH 2.0-2.5) onto the substrate that triggers the remainder of the coating or the water soluble substrate underneath to dissolve.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A water-soluble substrate comprising a first surface and a second surface opposite to said first surface, and a thickness between said first and second surfaces, comprising a coating, wherein said coating comprises (A) discrete zones comprising an acidic material which is water-soluble at a pH of from about 6 to about 7 partially embedded in the thickness of the water-soluble substrate on the first surface, and (B) a pH-sensitive material that is water-soluble at a pH of less than about 6 applied to the water-soluble substrate on the first surface in a discontinuous manner.

2. A water-soluble substrate comprising a first surface and a second surface opposite to said first surface and a thickness between said first and second surfaces, comprising a coating, wherein said coating comprises (A) discrete zones comprising an alkaline material which is water-soluble at a pH of from about 6 to about 7 partially embedded in the thickness of the water-soluble substrate on the first surface, and (B) a pH-sensitive material is water-soluble at a pH more than about 7 applied to the water-soluble substrate on the first surface in a discontinuous manner.

3. A water-soluble substrate according to claim 1, wherein said pH-sensitive material is water-soluble at a pH of about 1 to about 5.9.

4. A water-soluble substrate according to claim 2, wherein said pH-sensitive material is water-soluble at a pH of about 7.5 to about 15.

5. A water-soluble substrate according to claim 1, wherein said acidic material is selected from the group consisting of organic acid, inorganic acid, acid precursor, or combinations thereof.

6. A water-soluble substrate according to claim 2, wherein said alkaline material is selected from the group consisting of salts formed by weak acids with strong bases and weak acids with weak bases with basic pKa, carbonates and bicarbonates, metal hydroxides, ammonia and amines, mono-ethanolaniine, metal oxides, pyridine, their salts and combinations thereof.

7. A method of producing a water-soluble substrate comprising a first surface and a second surface opposite to said first surface, and a thickness between said first and second surfaces, comprising a coating, the method comprising the steps of:

(a) wetting at least the first surface or the second surface to at least partially dissolve an outer portion of the first surface or the second surface;

(b) applying discrete zones comprising an acidic material which is water-soluble at a pH of from about 6 to about 7, (c) applying in a discontinuous manner a pH-sensitive material that is water-soluble at a pH of less than about 6;

(d) drying the water-soluble substrate.

8. A method of producing a water-soluble substrate comprising a first surface and a second surface ooposite to said first surface, and a thickness between said first and second surfaces, comprising a coating, the method comprising the steps of;

(a) wetting at least the first surface or the second surface to at least partially dissolve an outer portion of the first surface pr the second surface;

(b) applying in a discontinuous manner discrete zones comprising an alkaline material which is water-soluble at at pH of from about 6 to about 7, (c) applying a pH-sensitive material that is water-soluble at a pH more than about 7;

(d) drying the water-soluble substrate.

* * * * *